United States Patent [19]
Preutz

[11] Patent Number: 6,135,592
[45] Date of Patent: Oct. 24, 2000

[54] LIGHTWEIGHT SPECTACLES

[75] Inventor: Staffan Preutz, Boden, Sweden

[73] Assignee: Polaris Inter AB, Boden, Sweden

[21] Appl. No.: 09/202,042

[22] PCT Filed: Apr. 7, 1997

[86] PCT No.: PCT/JP97/01186
§ 371 Date: Jun. 8, 1999
§ 102(e) Date: Jun. 8, 1999

[87] PCT Pub. No.: WO98/45748
PCT Pub. Date: Oct. 15, 1998

[51] Int. Cl.[7] ....................................................... G02C 5/14
[52] U.S. Cl. ............................ 351/41; 351/111; 351/123; 351/136
[58] Field of Search .............................. 351/41, 111, 123, 351/124, 126, 129–132, 136, 137

[56] References Cited

U.S. PATENT DOCUMENTS 1,533,506   4/1925   Mann ........................................ 351/123

FOREIGN PATENT DOCUMENTS 1262034   4/1961   France ..................................... 351/123

*Primary Examiner*—Huy Mai
*Attorney, Agent, or Firm*—Michael D. Bednarek; Shaw Pittman

[57] ABSTRACT

Light and compact spectacles which can be easily put on and can be surely held on the face are provided. Furthermore, the spectacles which can be easily put on and taken off are provided. The spectacles according to the present invention have two nose pads (18, 18') and two temple pads (24, 24'). The nose pads (18, 18') extend from a bridge (14) having an elasticity for connecting between two lenses (12, 12'). Temple pads (24, 24') are mounted to temple arms (20, 20') extending from the two lenses (12, 12') to pit regions of both temples of the head and having the elasticity. When the spectacles are put on, the nose pads (18, 18') push on both the sides of the nose. The temple pads (24, 24') are pushed onto the pit regions of the temples at both the sides of the head by a stress from the respective temple arms (20, 20'), and they are fixed at the pit regions. Furthermore, the spectacles have grips (16, 16') protruded from the bridge (14). The grips (16, 16') can be grasped by fingers. The bridge (14) is flexed by firmly grasping grips (16, 16'), and the grips (16, 16') are associated with the bridge (14) so that the distances between the two temple arms (20, 20') and the two temple pads (24, 24') may be spaced with the bridge (14) as a support.

7 Claims, 8 Drawing Sheets

LIGHTWEIGHT SPECTACLES

TECHNICAL FIELD

The present invention relates to new spectacles which are light, are easily handled and reduce a discomfort when the spectacles are put on.

BACKGROUND ART

In general, the spectacles comprise two lenses, a frame surrounding the lenses, a bridge connecting between the lenses, temple arms extending from the lenses to upper ear portions and earpieces connected to the temple arms so as to be put behind the ears.

The whole large and heavy spectacles would not only give the discomfort to a user with spectacles on, but also give a sense of fatigue to the user who uses the spectacles for a long time. Accordingly, the spectacles which are as compact and light as possible and are comfortable for the user are required.

Furthermore, since the spectacles are frequently put on and taken off, the simple handling thereof is required. Moreover, even if the spectacles are toughly handled, it requires that they are not easily deformed and damaged.

In order to solve the problems, the generally used spectacles are the spectacles in which a shape memory alloy capable of maintaining a specific shape which is not easily deformed and comprise a light material is used for the bridge and the temple arm, and the spectacle using a plastic lens lighter than a glass lens.

For example, FIG. 1 shows the spectacles disclosed in U.S. Pat. No. 718,363. According to the spectacles according to U.S. Pat. No. 718,363, a metal wire material is used for the bridge connecting between the lenses, a rim supporting the lenses and a so-called temple arm used for putting on the spectacles on the face. Thus, since an exterior load applied to the spectacles could be easily absorbed, a stress is not locationally generated at the bridge, the rim or the like, whereby a damage can be avoided.

However, according to the conventional spectacles, since the spectacles are held at both the ears and both the side portions of the nose by the earpieces, the spectacles must be put on and taken off by grasping and expanding the temple arms by hands. Accordingly, there is such a problem that a deformation is generated due to an excessive force applied to the temple arms. Furthermore, since the temple arm is one thin wire material, there is another problem that the whole spectacles are deformed when grasped, and the spectacles are hard to grasp.

On one hand, there are known the spectacles which are attached to the head by wires without fixing by the earpieces and the spectacles which are simply held on the nose. However, the former has such a problem that it takes a complicated labor to attach the wires to the head and the wires are obstructive when the spectacles are accommodated. The later has such a problem that the spectacles cannot be surely held on the face.

The present invention is made so as to solve the problems.

Accordingly, it is an object of the present invention to provide the spectacles which are lighter and more compact than usual and can be easily surely held on the face.

It is another object of the present invention to provide the spectacles which can be easily handled when put on and taken off and which does not excessively deform the temple arms and the like.

DISCLOSURE OF THE INVENTION

There are here disclosed spectacles comprising bridge having an elasticity for connecting two lenses to each other and two temple arms having the elasticity, each extending from each of the lenses which further comprises two nose pads for pushing both the sides of the nose and two temple pads mounted to each of the two temple arm for pushing on pit regions of the temples at both the sides of the forehead, whereby four pads hold the spectacles on the face.

In such a manner, the four pads are used, the two pads of them push on both the sides of the nose and the other two pads push on the put regions of the temples at both the sides of the head, whereby the spectacles are supported on the face at total four points. Thus, since the portion in contact with a human being is considerably reduced, compared to the conventional spectacles, a discomfort to the human being due to the contact can be reduced. Furthermore, since the pads are pushed on the pit regions so as to support the spectacles, the spectacles can be stably held.

Furthermore, according to the present invention, there is provided the spectacles having two grips. The grips can be held between fingers. When the two grips are pushed on by the fingers so that the distance between the grips may be reduced, the bridge is flexed with the center portion of the bridge as the center so that the distances between the two temple arms and between the two temple pads may be spaced. When a force of the fingers is reduced so as to release the pushing force from the grips, the grips return where they were by means of an elastic force of the bridge. Accordingly, while a user is simply grasping the grips, the user carries the spectacles near the face. The user simply releases his hold of the grips at a suitable position for fitting the spectacles on the face, that is, where the nose pads are positioned at both the sides of the nose and the temple pads are positioned at the pit regions of both the temples, whereby the user can easily put on the spectacles. When the spectacles are taken off, the contrary procedure can be simply carried out. Thus, since the grips are simply grasped and pushed so as to put on and take off the spectacles, an inadvertent deformation of the temple arms as usual can be avoided.

The bridge and the temple arms comprise an elastic material. For example, the material is a metal wire material having a spring characteristic, a shape memory alloy containing a nickel and titanium and having a high memory or a carbon fiber whose main component is a carbon having high elasticity, heat insulation and chemical resistance. Accordingly, the bridge and the temple arms can be made of a thin wire material, and it is possible to provide the spectacles which are light and gives less discomfort to the user. Furthermore, since the pads can be sufficiently ensured to be pushed on both the sides of the nose and both the pit regions of the temples at both the sides of the face, it is possible to provide the spectacles which can be surely held at four points alone.

Furthermore, preferably, in order to reduce more discomfort for the user, each pad is a disk-shaped silicon material having some thickness so as to be provided with an elasticity. Flat portion of the pads are in contact with the nose and the pit regions of the temples, whereby a friction between a skin and the pads becomes stronger, so that the spectacles are not easily slipped down.

In consideration of the use and cost of the spectacles, a plastic material may be used for the bridge and the temple arms. The end portions of the temple pad extending from the lenses are used as the temple pads as it is so that the end portions may push on the pit regions of the temples.

BRIEF DESCRIPTION OF THE DRAWINGS

FIG. 7 is a perspective view of the face with the spectacles according to the embodiment of the present invention shown in FIG. 2 on.

BEST MODE FOR CARRYING OUT THE INVENTION

Figure 1:
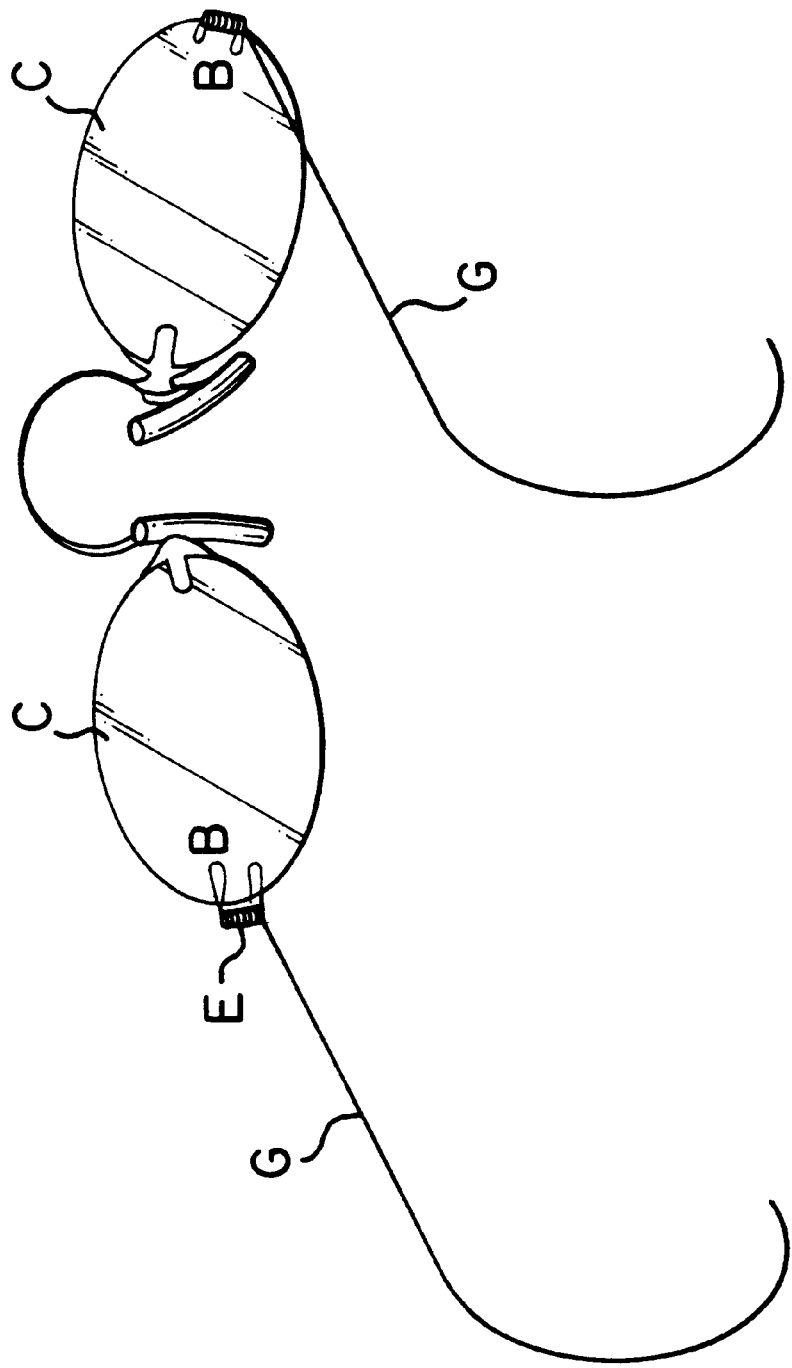
FIG. 1 is a perspective view showing an example of conventional spectacles.
Figure 2:
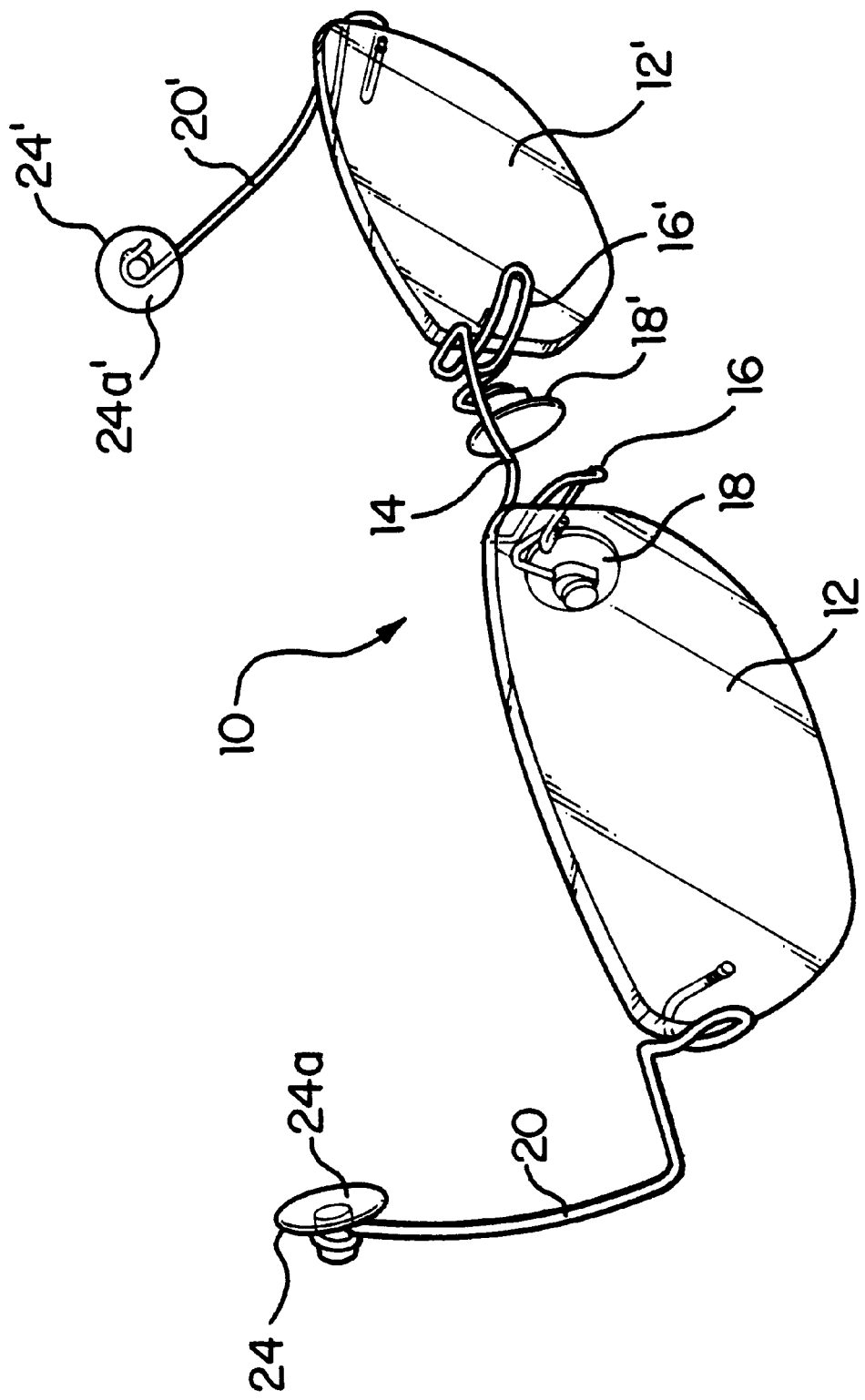
FIG. 2 is a perspective view showing an embodiment of the spectacles according to the present invention.

FIG. 2 shows a general view of spectacles (10) according to an embodiment of the present invention. Respective end portions of two symmetrical lenses (12, 12') for both eyes are connected to a bridge (14) so that the lenses (12, 12') may be symmetrical about the bridge (14). Two nose pads (18, 18') are disposed near both the ends of the bridge (14). Temple arms (20, 20') are mounted to both the outer ends of the lenses (12, 12'), respectively. Temple pads (24, 24') are mounted to the edges of the temple arms (20, 20'), respectively.

In this example, each of the bridge (14) and the temple arms (20, 20') is one elastic metal wire, whereby the whole spectacles (10) are intended to be lightened. Constitutions of the bridge (14) and the temple arms (20, 20') will be independently described in detail.

The important is that the spectacles (10) are held on a face by four pads, that is, the two nose pads (18, 18') and two temple pads (24, 24'). The spectacles are supported on the face at four points, whereby the spectacles can be put on on the face. Aside from this, since an area where the spectacles are in contact with the face is reduced, a user's discomfort due to the contact of the spectacles with the face can be reduced. In addition, there are some advantages as described above.

The more important is the temple pads (24, 24') are disposed in such a manner that they are just positioned at pit regions of the temples at both the ends of the user's head. Since the temples are pitted at the tails of eyebrows, the temple pads (24, 24') are received at the pit regions. Furthermore, the temple arms (20, 20') give an appropriate inward elasticity to the temple pads (24, 24'), whereby the spectacles (10) are held at the position on the face. In such a manner, the nose pads (18, 18') push on both the sides of the nose, and the temple pads (24, 24') being received at the pit regions of the temples push on the pit regions, whereby the spectacles (10) are not easily slipped down the face.

Figure 3A:
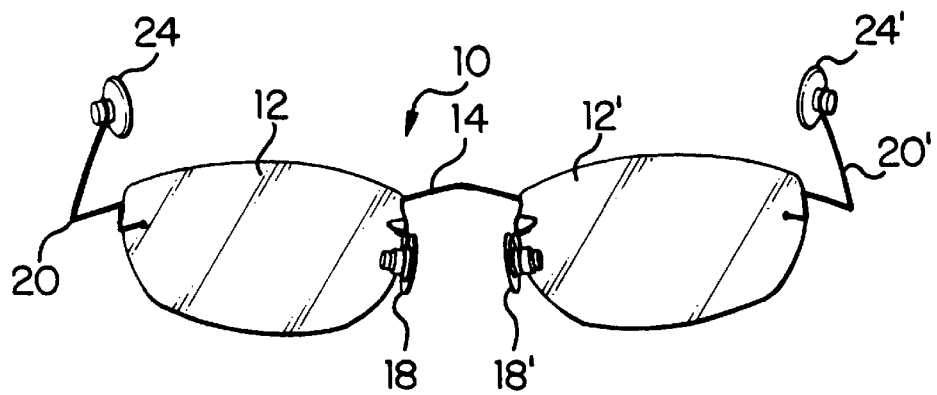
FIG. 3A is an elevational view of the spectacles according to the embodiment of the present invention shown in FIG. 2.
Figure 3B:
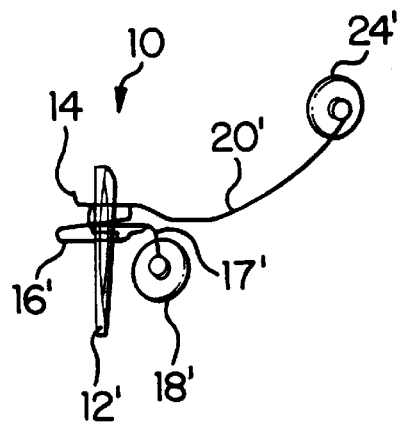
FIG. 3B is a side view of the spectacles according to the embodiment of the present invention shown in FIG. 2.
Figure 3C:
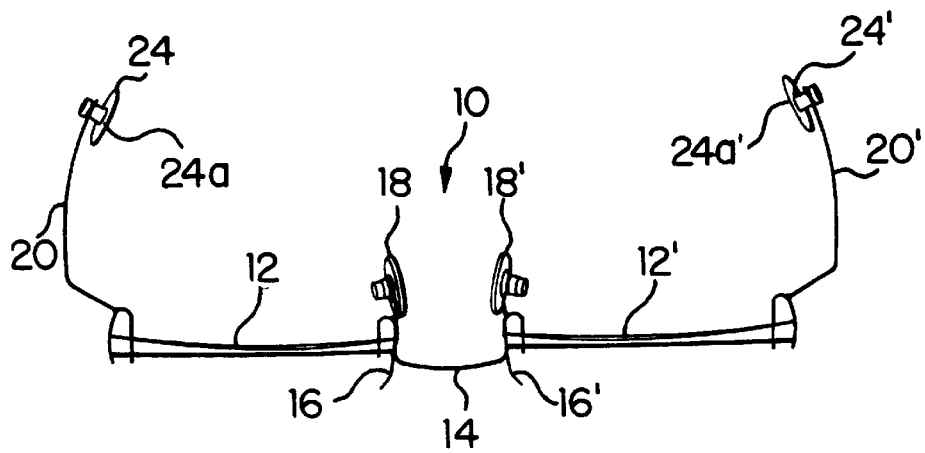
FIG. 3C is a top view of the spectacles according to the embodiment of the present invention shown in FIG. 2.

FIGS. 3A, 3B and 3C show an elevational view, a side view and a top view of the spectacles (10) shown in FIG. 2, respectively.

As clearly understood by FIGS. 3A and 3B, when the nose pads (18, 18') are pushed onto both the sides of the nose, the temple arms (20, 20') are inclined upward at the back of the lenses and extended in such a manner that the temple pads (24, 24') are just positioned at the pit regions of the human temples. The temple pads (24, 24') are mounted at the ends of the temple arms (20, 20'). On one hand, the nose pads (18, 18') are inclined to each other and are mounted to the bridge (14) so that they may be in contact with both the sides of the nose and may support the spectacles (10).

In fact, the necessary length and inclination for the temple arms (20, 20') extending from the lenses (12, 12') to the pit regions is different in accordance with the size and shape of the face of the user using the spectacles (10). Accordingly, the temple arms (20, 20') may be made and used for each user. Furthermore, some kinds of temple arms (20, 20') having different sizes may be previously prepared, and optimum temple arms (20, 20') for the user may be selected and be used among them. When the user is an adult, in general, it is sufficient to use the average temple arms (20, 20') obtained by the average value of the distance and position from the eye to the pit region of the temple. The reason is that since the distance between the eye and the pit region of the temple is short, a dispersion of the distance and position due to the different user is small. Furthermore, another reason is that the pit region has more or less extension.

In this example, the nose pads (18, 18') and the temple pads (24, 24') are made from a silicon, and have more or less thick elastic disk shape. As shown in FIG. 4B, one side of the nose pads (18, 18') is mounted to extending nose arms (17, 17') splitted from the bridge (14) and the end portion of the temple arms (20, 20'). The other side of the nose pads (18, 18') has a bottom portion in contact with the side of the nose and the pit region of the temple. Preferably, such a fitting mechanism is used that the pads can flexibly move to some extent at the end portion of the arm in such a manner that the pit regions of the temples or the side portions of the nose are in contact with the surfaces of bottom portions of the pads. This example shows the pads which are directly fixed and mounted to the arms. The shape and material of the nose pads (18, 18') and the temple pads (24, 24') and the mechanism for fitting the pads to the arm are not limited to the above example except for the case limited by Claims. As far as they are not harmful to a human being, any method and means may be used.

Before the spectacles are not put on, the distance between the temple pads (24, 24') keep shorter than the distance between both the end portion of the temples of the user's head. When the user puts on the spectacles, the bridge (14) and the temple arms (20, 20') generate a stress for attempting to put the outward extended temple pads (24, 24') back where they were. The temple pads (24, 24') are pushed from outside onto the pit regions of the temples, so that the spectacles are held on the face. Accordingly, as shown by the temple pads (24, 24') in FIG. 3C, when the user puts on the spectacles, usually, bottom portions (24a, 24a') of the temple pads (24, 24') are slightly inward directed and the temple arms (20, 20') also are slightly inward curved on the way to the temple pads (24, 24') so that the temple pads (24, 24') may be parallel to the pit regions of the temples of the head.

One part of both the sides of the nose expanding toward the mouth is in contact with and puts on the pad bottom portion, whereby the nose pads (18, 18') are supported. In order that the nose pads (18, 18') may not be dropped, the nose pads (18, 18') are inclined and spaced from each other at a certain distance.

Figure 4A:
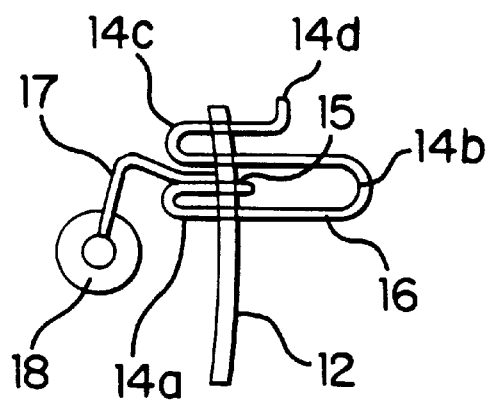
FIG. 4A is a side view of a bridge and a nose pad mounted thereto shown in FIG. 2.
Figure 4B:
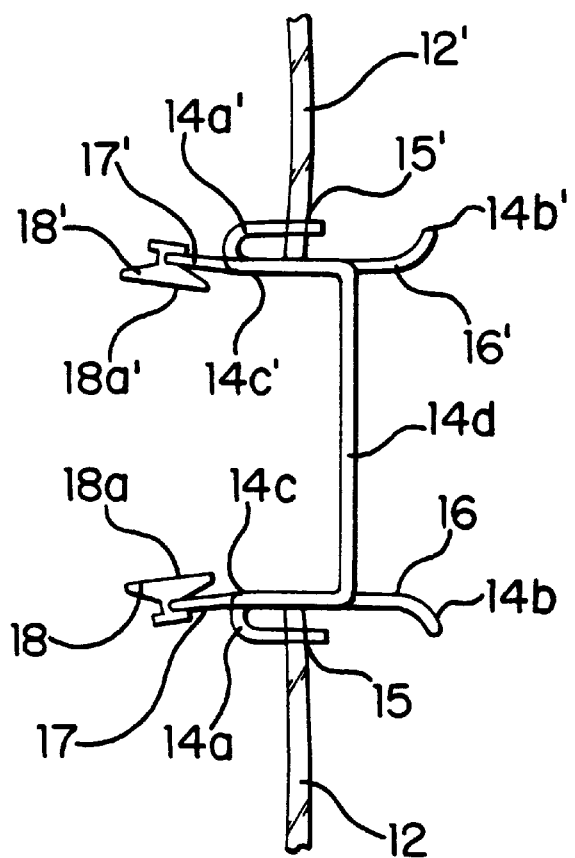
FIG. 4B is a top view of a bridge and a nose pad mounted thereto shown in FIG. 2.

FIG. 4A shows a side view of the bridge (14) and the nose pad (18) mounted to the bridge (14). FIG. 4B shows a top view of FIG. 4A.

The whole bridge (14) comprises one metal wire material. The edge of the bridge (14) passes through a hole (15) bored through the lens (12). The metal wire extending backward from the hole (15), that is, toward the nose pad (18) draws a first U-shape (14a) on the way and turns back, so that the metal wire is in contact with the side end of the lens (12) and it proceeds forward, that is, in direction which the lens (12) is directed to. Furthermore, the metal wire draws a next U-shape (14b) and turns back, so that the metal wire is in contact with the side end of the lens (12) and it proceeds backward. The metal wire of the bridge (14) pinches the lens by the elasticity thereof at three points including the hole and the two contact portions of the side ends of the lenses, whereby the bridge (14) and the lens (12) are fixed and connected to each other.

The metal wire extending backward from the lens (12) draws a further U-shape (14c) on the way, and the metal wire turned up so that it may avoid contacting with the nose. The metal wire is directed to the other lens (12'), and the metal wire is constructed symmetrically to the metal wire extended from the lens (12), so that the metal wire passes through a hole (15') bored through the other lens (12') and it is fixed and connected.

The nose arms (17, 17') are splitted from one part of the first U-shapes (14a, 14a') and extended, and the nose pads (18, 18') are mounted to the edges of the nose arms (17, 17'). The two nose pads (18, 18') are inclined and face each other in such a manner that both the sides of the nose are parallel to pad bottom portions (18a, 18a') of the nose pads (18, 18'). Furthermore, the distance between the nose pads (18, 18') keeps such a distance that the nose pads (18, 18') are in contact with the sides of the nose. Preferably, the material of the nose arms (17, 17') is the same as that of the bridge (14).

Since a method for connecting the nose arms (17, 17') to the bridge (14) is not specifically important for the present invention, any method may be used. Although FIGS. 4A and 4B show the example that the nose arms (17, 17') are splitted from the bridge (14), the present invention is not limited to this. The nose arms (17, 17') may be connected to the lenses (12, 12') and may be extended.

Figure 5:
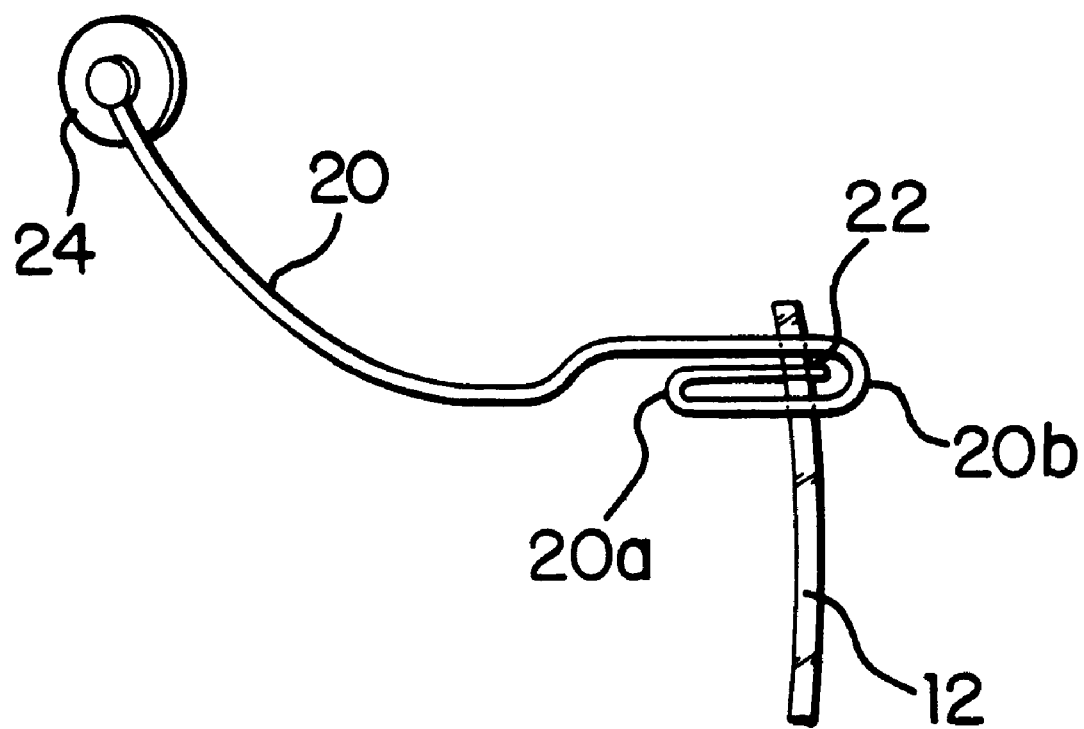
FIG. 5 is a side view of a temple arm and a temple pad mounted thereto shown in FIG. 2.

FIG. 5 shows a side view of the temple arm (20) shown in FIG. 2 and the temple pad (24) mounted to the temple arm (20). Since the other temple arm (20') and temple pad (24') are the same as the temple arm (20) and the temple pad (24) to be described below except for the symmetrical shape thereto, the description is omitted.

The temple arm (20) comprising one elastic metal wire material passes through a hole (22) bored at the outer end portion of the lens (12).

The metal wire extending backward from the hole (22), that is, toward the temple pad (24) draws a first U-shape (20a) and turns back, so that the metal wire is in contact with the outer side end of the lens (12), and it proceeds forward, that is, in direction which the lens (12) is directed to. Furthermore, the wire metal draws a next U-shape (20b) and turns back, so that the metal wire is in contact with the outer side end of the lens (12), and it proceeds backward. The metal wire pinches the lens by the elasticity thereof at three points including the hole (22) and the two contact portions of the side ends of the lenses, whereby the temple arm (20) and the lens (12) are fixed and connected to each other.

As shown in FIG. 2, the metal wire passing the outer side end of the lens (12) and extending backward curves outward on the way so that it may avoid contacting with the head side portion. Thenceforth, as shown in FIG. 5A, the metal wire are gently curved upward, and extends to the pit region of the temple of the head. Furthermore, as shown in FIG. 2, when the spectacles (10) are put on, while the metal wire are curved inward so that it may avoid contacting with the head side portion, it extends in a horizontal direction. The temple pad (24) is mounted to the extended edge of the metal wire just at the pit region of the temple.

In such a manner, since the temple arms (20, 20') do not need to extend near the ears and can be reduced, the whole spectacles (10) can be lightened.

Figure 7:
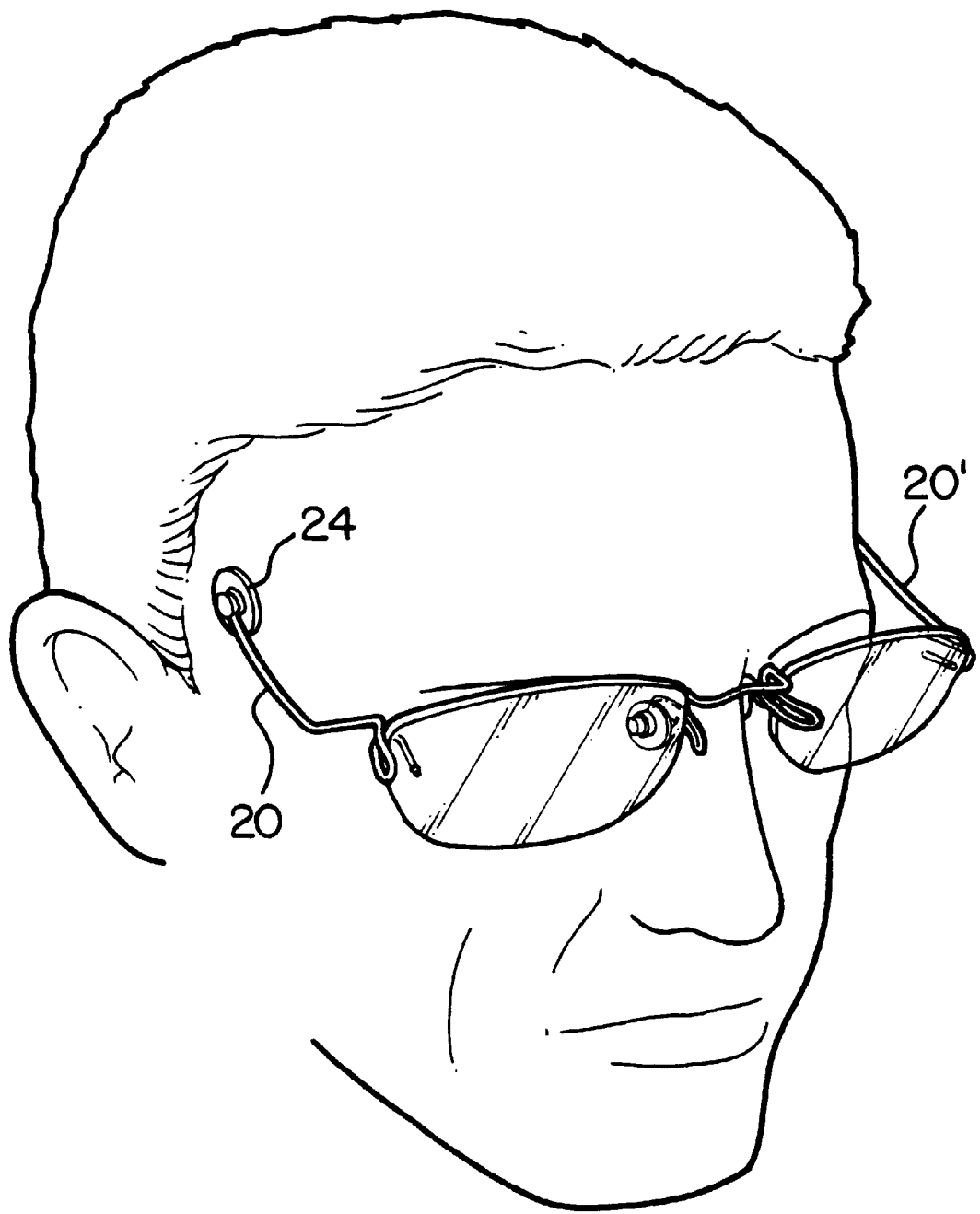

FIG. 7 shows an example of the face with spectacles (10) on. The temple pads of the spectacles (10) are just in contact with and fixed to the pit regions of the temples, and the nose pads are support by both the upper sides of the nose.

The metal wire material constituting the temple arms (20, 20') may be the same metal wire material having the elasticity as used for the bridge (14). Furthermore, a shape memory alloy which is light, has a restoring force and enables to push the pads onto the face may be used. The known shape memory alloy contains a nickel and a titanium in the substantial same ratio, and this alloy may be used.

Instead of the metal wire, a carbon material having an elastic characteristic, for example, a carbon fiber may be used for the bridge (14) and the temple arms (20, 20'). Furthermore, if the material is so elastic that the spectacles (10) can be held on the face by four pads, a plastic material and other material having a spring characteristic may be used.

As described above, any shape and material of the pads may be used except for the shape and material limited by Claims. That is, any shape and material which enables to push both the sides of the nose and the pit regions of the temples may be used.

As shown in FIGS. 4A and 4B, according to the present invention, the still more important is that protrusions formed by the second U-shape (14b) are grips (16, 16'). The grips (16, 16') allows the user to easily put on or take off the spectacles. When the spectacles are put on or taken off, the grips (16, 16') prevents an excessive deformation of the temple arms. The constitution of the grips (16, 16') will be described below. The grips (16, 16') extend from the first U-shapes (14a, 14a'), and they cross over the lenses (12, 12'). The grips (16, 16') being slightly outward curved form the U-shapes (14b, 14b'), and they turn back. Such U-shapes cross over the lenses (12, 12') and are protruded in order to ensure the region to be pinched by fingers. Accordingly, preferably, the U-shapes (14b, 14b') have such a size as to just fit fingertips. Furthermore, as shown in FIG. 4B, the grips (16, 16') are slightly curved so that the edge portions thereof may be expanded. This reason is that the edge portions are in contact with a bulb of the fingertip so that the grips can be firmly pushed when the grips are pinched.

Figure 6:
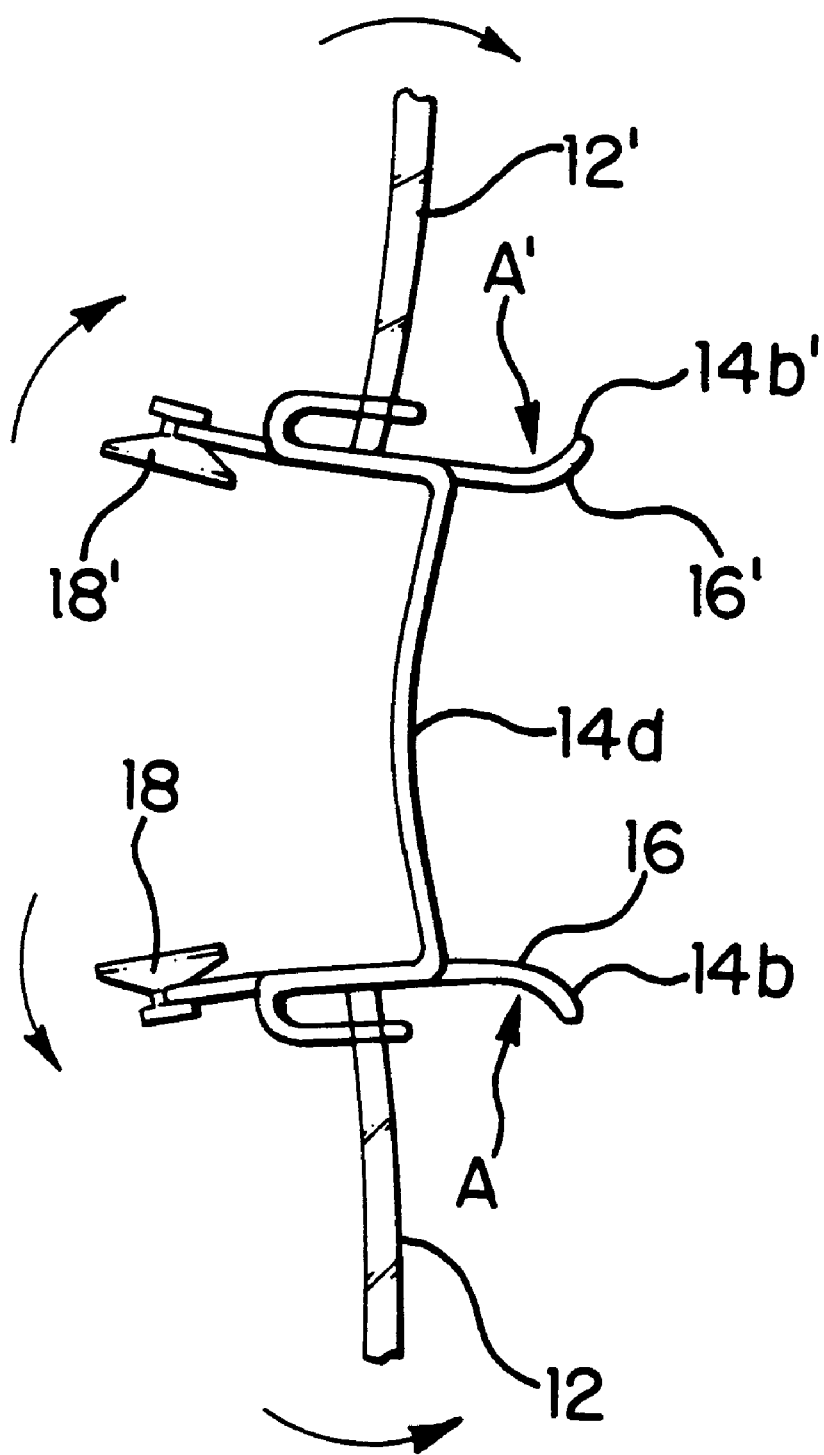
FIG. 6 shows a deformed bridge when grips formed at one part of the bridge are grasped.

An action of the grips (16, 16') will be described with reference to FIG. 6. FIG. 6 shows a change of the position of the whole bridge (14), the nose pads (18, 18') and the lenses (12, 12') when the grips (16, 16') are pinched inward between the fingers. When inward forces (shown by arrows A, A') are applied to the grips (16, 16'), the forces are transmitted near a bridge center portion (14d) via third U-shaped portions (14c, 14c'). At this point, the forces concentrated near the bridge center portion (14d) repulse from each other, and moments having the force in opposite directions relative to a support near the bridge center portion (14d) are generated at both the sides of the bridge (14). The bridge (14) is curved so that one grips (16) may be rotated counterclockwise and the other grips (16') may be rotated clockwise. Accordingly, the U-shapes (14c, 14a and 14c', 14a') formed at the opposite position to the grips (16, 16') are deformed so that they may be expanded outward. In accordance with the deformation, the nose pads (18, 18') are also opened outward as shown by arrows. Furthermore, the change allows one lens (12) to rotate counterclockwise, and the change allows the other lens (12') to rotate clockwise. Therefore, the temple arms (20, 20') mounted to the other end of the lenses (12, 12') shown in FIGS. 2 and 3 are also moved in accordance with the rotating movement, and the distance between the temple pads (24, 24') is expanded. Since the temple arms (20, 20') are much longer than the grips (16, 16'), even if the grips (16, 16') are slightly changed, the distance between the temple pads (24, 24') is expanded substantially proportionally to the length of the temple arms (20, 20').

A handling will be described below. The grips (16, 16') are held between the fingers, and the spectacles (10) are carried in front of the user's face. In this case, if a pinching force is applied to the grips (16, 16'), the distances between the nose pads (18, 18') and between the temple pads (24, 24') are expanded. With the distances open, the nose pads (18, 18') and the temple pads (24, 24') are carried at both the sides of the nose and the pit regions of the temples, respectively. At this point, the fingers are separated from the grips (16, 16'). As described above, by means of the stress, the bridge (14) and the temple arms (20, 20') are intended to recover where they were. Accordingly, the nose pads (18, 18') and the temple pads (24, 24') push on the face at both the sides, and they are fixed on the face at the positions.

Taking off the spectacles is easily accomplished by the contrary procedure alone. That is, when the grips (16, 16') are held between the fingers and pushed, the nose pads (18, 18') and the temple pads (24, 24') are separated from the face, whereby the spectacles can be taken off from the face.

As described above, when the spectacles are put on or taken off, it is not necessary to grasp and extend the temple arms. Accordingly, the temple arms are not deformed by an inadvertent excessive force applied to the temple arms. Furthermore, since the U-shaped protruded grips can be held between the fingers of one hand, the handling is very easy. Moreover, since the force of the fingers is limited, the grips are not excessively deformed.

Figure 8:
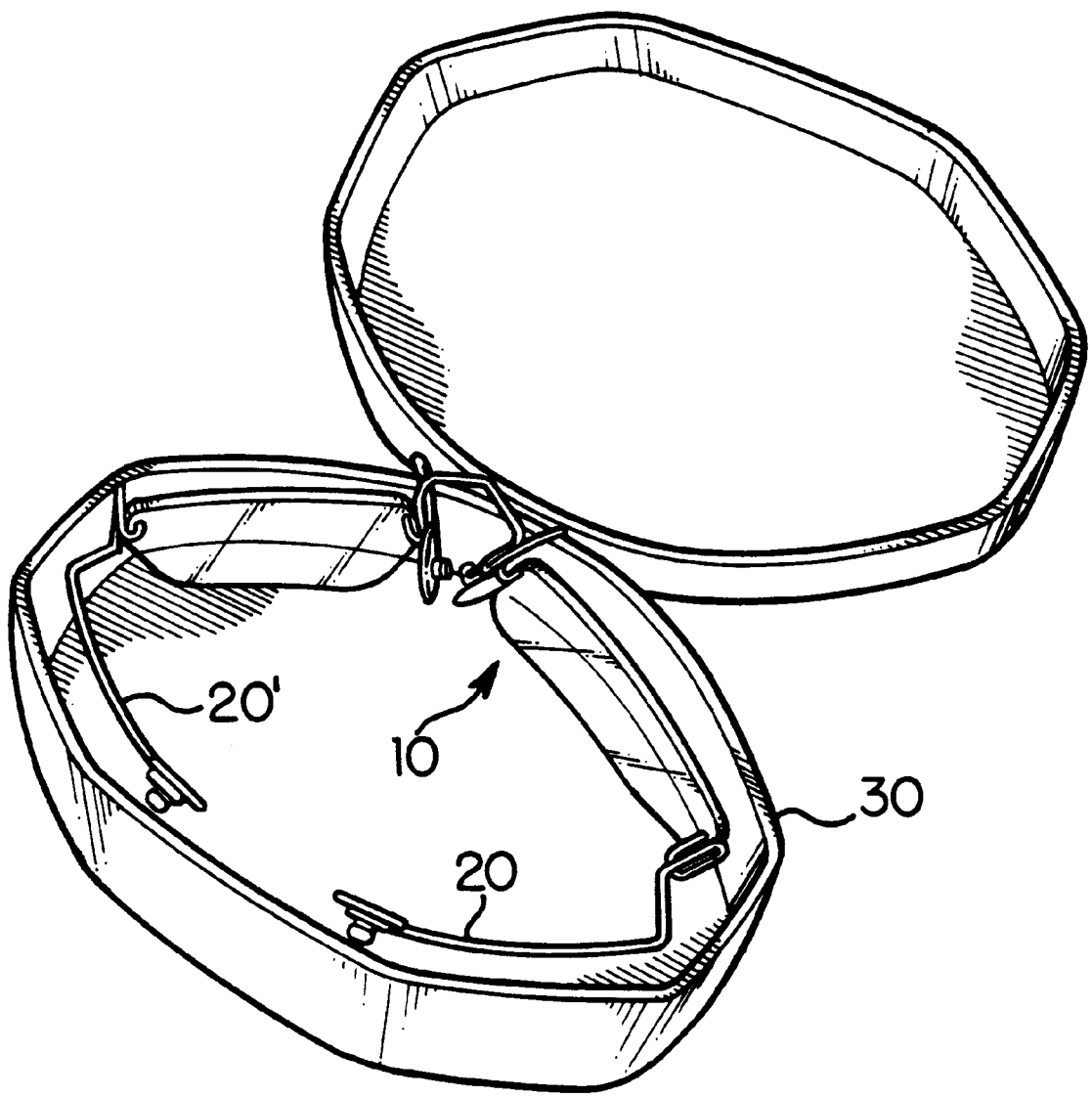
FIG. 8 is a general view showing the spectacles according to the present invention shown in FIG. 2 accommodated in a spectacle case.

FIG. 8 shows the spectacles (10) accommodated in a spectacle case (30). The spectacles (10) are flexed near the bridge center portion in such a manner that the lenses and the temple arms draw one arc. Furthermore, as described with reference to a side view of the spectacles (10) shown in FIG. 3B, since the temple arms (20, 20') are inclined upward, the spectacles (10) can be accommodated in such a manner that the lenses are inclined obliquely relative to the bottom surface of the case (30), whereby the accommodation can be more compact.

POSSIBILITY OF INDUSTRIAL UTILIZATION

The spectacles according to the present invention can be used by any person who needs the spectacles except for persons who take heavy exercise or persons who exist in a severe environment such as a strong wind.

Since the spectacles according to the present invention are held on the face by four pads, the contact area of the spectacles to the skin is reduced, whereby the discomfort can be eased when the spectacles are put on. Furthermore, since two of the four pads are in contact with the pit regions of the temples at both the sides of the face, the spectacles can be easily surely held on the face. Moreover, since the length of the temple arms can be excessively shortened, compared to conventional spectacles, more compact lighter spectacles can be provided. Accordingly, since the discomfort and a sense of fatigue which a human being feels can be reduced, more specifically, the spectacles of the present invention is effective in doing a desk work and in watching a television, a movie or the like for a long time.

Furthermore, the grips are disposed near the center portion of the lenses, whereby the grips are held between the fingers so that the spectacles can be carried. In addition, the force of the fingers is applied to or released from the grips, whereby the temple arms and the temple pads can be opened and closed. Accordingly, it is not necessary to take the spectacles out of the case, to open both the temple arms, to grasp the temple arms and to carry earpieces above the ears. The spectacles according to the present invention can be simply held between the fingers. That is to say, the grips are held between the fingers so as to take the spectacles out of the case, and the force is simply applied to the grips, whereby the spectacles can be put on. Accordingly, a person having one disabled hand can easily put on the spectacles without any trouble.

What is claimed is:

1. Spectacles comprising a bridge (14) having an elasticity for connecting two lenses to each other and two temple arms (20, 20') having the elasticity, each extending from each of said lenses, further comprising:

two nose pads (18, 18') biased towards one another for pushing both the sides of a nose; and two temple pads (24, 24') mounted to each of said two temple arms (20, 20') for pushing on pit regions of a wearer's temples at both the sides of a forehead, whereby four pads (18, 18', 24, 24') hold the spectacles on a face.

2. The spectacles according to claim 1, further comprising two grips (16, 16') wherein said two grips (16, 16') can be held between fingers;

said two grips (16, 16') are pushed on, whereby said bridge (14) is flexed with the center of said bridge (14) as a support so that distances between said two temple arms (20, 20') and between said two temple pads (24, 24') can be spaced;

a pushing force on said grips (16, 16') is released, whereby said grips (16, 16') are associated with said bridge (14) so that said grips (16, 16') can return where they were by means of an elastic force of said bridge.

3. The spectacles according to claim 1, wherein said bridge (14) and said temple arms (20, 20') comprise a metal wire material having a spring characteristic.

4. The spectacles according to claim 1, wherein said bridge (14) and said temple arms (20, 20') comprise a memory alloy containing nickel and titanium.

5. The spectacles according to claim 1, wherein said bridge (14) and said temple arms (20, 20') comprise a plastic material having the elasticity.

6. The spectacles according to claim 1, wherein said bridge (14) and said temple arms (20, 20') comprise a carbon fiber having the elasticity.

7. The spectacles according to claim 1, wherein said nose pads (18, 18') and said temple pads (24, 24') comprise a silicon material.

* * * * *